(12) United States Patent
Dreyer et al.

(10) Patent No.: US 11,142,680 B2
(45) Date of Patent: Oct. 12, 2021

(54) CONTROLLED RELEASE SOLID SCALE INHIBITORS

(71) Applicant: ChampionX USA Inc., Sugar Land, TX (US)

(72) Inventors: Daniel Robert Dreyer, Missouri City, TX (US); Thomas Smith, New Castle, PA (US); Pious Kurian, Sugar Land, TX (US)

(73) Assignee: ChampionX USA Inc., Sugar Land, TX (US)

( * ) Notice: Subject to any disclaimer, the term of this patent is extended or adjusted under 35 U.S.C. 154(b) by 0 days.

(21) Appl. No.: 15/845,164

(22) Filed: Dec. 18, 2017

(65) Prior Publication Data

US 2018/0179434 A1  Jun. 28, 2018

Related U.S. Application Data (60) Provisional application No. 62/438,804, filed on Dec. 23, 2016.

(51) Int. Cl.
| | |
|---|---|
| *C09K 8/536* | (2006.01) |
| *C09K 8/528* | (2006.01) |
| *C09K 8/80* | (2006.01) |
| *C03C 1/00* | (2006.01) |
| *C09K 8/92* | (2006.01) |

(Continued)

(52) U.S. Cl.
CPC .............. *C09K 8/536* (2013.01); *C03C 1/006* (2013.01); *C03C 3/16* (2013.01); *C09K 8/528* (2013.01); *C09K 8/70* (2013.01); *C09K 8/80* (2013.01); *C09K 8/92* (2013.01); *E21B 43/26* (2013.01)

(58) Field of Classification Search
CPC .......... C09K 8/92; C09K 8/528; C09K 8/536; Y10S 507/902; Y10S 507/927
See application file for complete search history.

(56) References Cited

U.S. PATENT DOCUMENTS

| | | |
|---|---|---|
| 2,365,489 A | 12/1944 | Partridge |
| 2,437,475 A | 12/1945 | Oxford, Jr. |

(Continued)

FOREIGN PATENT DOCUMENTS

| | | |
|---|---|---|
| CA | 772 126 A | 11/1967 |
| EP | 0 046 078 A1 | 2/1982 |

(Continued)

OTHER PUBLICATIONS

Controlled Solubility Phosphates—A Versatile Solution to Oilfield Scale Problems, Ben Sloat et al., J. Petr. Tech., 12, Nov. 1960.*

(Continued)

*Primary Examiner* — Aiqun Li
(74) *Attorney, Agent, or Firm* — Stinson LLP (57) ABSTRACT

Compositions and methods of preparation and use for controlled release solid scale inhibitors used in hydraulic fracturing operations in oil and gas wells. The controlled release scale inhibitors comprise amorphous glass which is a reaction product of a phosphorus-containing compound, a calcium-containing compound, a magnesium-containing compound and base. The composition has a predetermined dissolution rate for controlled release of scale inhibitors in induced hydraulic fractures in hydraulic fracturing treatment of oil or gas wells.

18 Claims, 3 Drawing Sheets

(51) Int. Cl.
*E21B 43/26* (2006.01)
*C09K 8/70* (2006.01)
*C03C 3/16* (2006.01)

(56) References Cited

U.S. PATENT DOCUMENTS

| | | | |
|---|---|---|---|
| 2,601,395 A | 6/1952 | Hatch | |
| 3,272,588 A | 9/1966 | Fuchs | |
| 3,284,368 A | 11/1966 | Hatch | |
| 3,338,670 A | 8/1967 | Fuchs | |
| 3,341,453 A | 9/1967 | Ralston | |
| 3,432,428 A | 3/1969 | Wirth, Jr. et al. | |
| 3,476,689 A | 11/1969 | Newman | |
| 3,477,956 A | 11/1969 | Stanford et al. | |
| 3,480,083 A | 11/1969 | Oleen | |
| 3,532,167 A | 10/1970 | Noe, Jr. et al. | |
| 3,549,548 A | 12/1970 | Newman | |
| 3,584,687 A | 6/1971 | Stanford et al. | |
| 3,597,352 A | 8/1971 | Stanford et al. | |
| 3,609,092 A * | 9/1971 | Smith | C01B 25/45 252/175 |
| 3,620,974 A | 11/1971 | Stanford et al. | |
| 3,633,672 A | 1/1972 | Smith et al. | |
| 3,639,263 A | 2/1972 | Troscinski et al. | |
| 3,654,993 A | 4/1972 | Smith et al. | |
| 3,720,505 A | 3/1973 | Vogel | |
| 3,787,534 A | 1/1974 | Stanford et al. | |
| 3,827,977 A | 8/1974 | Miles et al. | |
| 3,880,765 A | 4/1975 | Watson | |
| 3,931,038 A | 1/1976 | Mochi-Bartolani et al. | |
| 3,933,689 A | 1/1976 | Ray et al. | |
| 3,948,792 A | 4/1976 | Watsen et al. | |
| 4,008,164 A | 2/1977 | Watson et al. | |
| 4,046,540 A | 9/1977 | Lewis et al. | |
| 4,051,110 A | 9/1977 | Quinlan | |
| 4,080,375 A | 3/1978 | Quinlan | |
| 4,172,032 A | 10/1979 | Farley | |
| 4,187,245 A | 2/1980 | Redmore et al. | |
| 4,234,511 A | 11/1980 | Buckman | |
| 4,291,763 A | 9/1981 | Singer | |
| 4,309,485 A | 1/1982 | Kondo et al. | |
| 4,326,873 A | 4/1982 | Reilly et al. | |
| 4,357,248 A | 11/1982 | Berkshire et al. | |
| 4,393,938 A | 7/1983 | Lawson et al. | |
| 4,406,811 A | 9/1983 | Christensen et al. | |
| 4,431,547 A | 2/1984 | Dubin | |
| 4,575,425 A | 3/1986 | Boffardi et al. | |
| 4,602,683 A | 7/1986 | Meyers | |
| 4,604,211 A | 8/1986 | Kneller et al. | |
| 4,642,194 A | 2/1987 | Johnson | |
| 4,676,911 A | 6/1987 | Fong | |
| 4,762,626 A | 8/1988 | Emmons et al. | |
| 4,801,388 A | 1/1989 | Fong et al. | |
| 4,809,778 A | 3/1989 | Johnson | |
| 4,817,722 A | 4/1989 | Montfort, Jr. et al. | |
| 4,860,829 A | 8/1989 | Carlberg et al. | |
| 5,018,577 A | 5/1991 | Pardue et al. | |
| 5,085,794 A | 2/1992 | Kneller et al. | |
| 5,112,496 A | 5/1992 | Dhawan et al. | |
| 5,141,655 A | 8/1992 | Hen | |
| 5,143,622 A | 9/1992 | Fong et al. | |
| 5,167,828 A | 12/1992 | Emmons et al. | |
| 5,171,459 A | 12/1992 | Kaplan | |
| 5,302,293 A | 4/1994 | Kaplan et al. | |
| 5,346,010 A | 9/1994 | Adams et al. | |
| 5,399,270 A | 3/1995 | Hen | |
| 5,403,493 A | 4/1995 | Mouche et al. | |
| 5,614,006 A | 3/1997 | Algar | |
| 5,741,433 A | 4/1998 | Mitchell et al. | |
| 5,750,070 A | 5/1998 | Tang et al. | |
| 5,776,875 A | 7/1998 | Tang et al. | |
| 5,840,638 A | 11/1998 | Cao et al. | |
| 5,840,658 A | 11/1998 | Rosario et al. | |
| 5,893,416 A | 4/1999 | Read | |
| 5,976,414 A | 11/1999 | Bedford et al. | |
| 6,077,440 A | 6/2000 | Roe et al. | |
| 6,209,646 B1 | 4/2001 | Reddy et al. | |
| 6,232,419 B1 | 5/2001 | Duggirala et al. | |
| 6,242,390 B1 * | 6/2001 | Mitchell | C09K 8/685 166/300 |
| 6,267,897 B1 | 7/2001 | Robertson et al. | |
| 6,572,789 B1 | 6/2003 | Yang et al. | |
| 6,787,506 B2 | 9/2004 | Blair et al. | |
| 6,808,557 B2 | 10/2004 | Holbrey et al. | |
| 7,195,070 B2 | 3/2007 | Delaloye et al. | |
| 7,419,937 B2 | 9/2008 | Rimmer et al. | |
| 7,451,823 B2 | 11/2008 | Wilson | |
| 7,491,682 B2 | 2/2009 | Gupta et al. | |
| 7,493,955 B2 | 2/2009 | Gupta et al. | |
| 7,503,389 B2 | 3/2009 | Delaloye et al. | |
| 7,704,903 B2 | 4/2010 | Seneschal et al. | |
| 7,896,068 B2 | 3/2011 | Lee | |
| 7,897,546 B2 | 3/2011 | Showalter et al. | |
| 7,902,127 B2 | 3/2011 | Kurian et al. | |
| 7,915,204 B2 | 3/2011 | De Campo et al. | |
| 8,162,054 B2 | 4/2012 | Schultz et al. | |
| 8,334,240 B2 | 12/2012 | Acosta | |
| 8,381,811 B2 | 2/2013 | Keatch et al. | |
| 8,551,925 B2 | 10/2013 | Nguyen et al. | |
| 8,822,390 B2 | 9/2014 | Heath et al. | |
| 8,980,101 B2 | 3/2015 | Musale | |
| 9,090,495 B2 | 7/2015 | Haag et al. | |
| 9,120,965 B2 | 9/2015 | Kurian et al. | |
| 9,193,610 B2 | 11/2015 | Smith et al. | |
| 9,221,700 B2 | 12/2015 | Greene et al. | |
| 9,228,123 B2 | 1/2016 | Song et al. | |
| 2003/0150613 A1 | 8/2003 | Freiter | |
| 2004/0043906 A1 | 3/2004 | Heath et al. | |
| 2004/0084186 A1 | 5/2004 | Allison | |
| 2005/0027048 A1 | 2/2005 | Nakagawa et al. | |
| 2006/0124301 A1 | 6/2006 | Gupta et al. | |
| 2011/0012703 A1 | 1/2011 | Menard et al. | |
| 2011/0127039 A1 | 6/2011 | Garcia-Lopez De Victoria et al. | |
| 2011/0162841 A1 | 7/2011 | Wilson | |
| 2012/0012326 A1 | 1/2012 | Darby et al. | |
| 2012/0080641 A1 | 4/2012 | Relenyi | |
| 2013/0255951 A1 | 10/2013 | Little et al. | |
| 2014/0042075 A1 | 2/2014 | Ding et al. | |
| 2014/0305650 A1 | 10/2014 | Song et al. | |
| 2015/0148266 A1 | 5/2015 | Webber et al. | |
| 2016/0160111 A1 * | 6/2016 | Smith | E21B 37/06 166/304 |
| 2016/0194225 A1 | 7/2016 | Lask et al. | |
| 2017/0158945 A1 | 6/2017 | Dreyer et al. | |
| 2017/0327727 A1 | 11/2017 | Dreyer et al. | |
| 2018/0265765 A1 | 9/2018 | Vo et al. | |

FOREIGN PATENT DOCUMENTS

| | | |
|---|---|---|
| EP | 0 108 685 A2 | 5/1984 |
| EP | 0 365 237 A2 | 4/1990 |
| EP | 0 632 692 B1 | 6/1996 |
| GB | 1 078 765 A | 8/1967 |
| RU | 2149219 C1 | 5/2000 |
| WO | 2012/177568 A1 | 12/2012 |
| WO | 2014/186174 A1 | 11/2014 |
| WO | 2015/087345 A1 | 6/2015 |
| WO | 2017/096127 A1 | 6/2017 |

OTHER PUBLICATIONS

Brauer, D.S., "Phosphate Glasses," Bio-Glasses: An Introduction, First Edition, 2012, pp. 45-64, John Wiley & Sons, Ltd.

Brow, R. K., "Nature of Alumina in Phosphate Glass: I, Properties of Sodium Aluminophosphate Glass," Journal of the American Ceramic Society, Apr. 1993, pp. 913-918, vol. 76, Issue 4.

Brow, R. K., et al., "Nature of Alumina in Phosphate Glass: II, Structure of Sodium Alurninophosphate Glass," Journal of the American Ceramic Society, Apr. 1993, pp. 919-928, vol. 76, Issue 4.

Bhardwaj, P., et al., "Polyacrylamide and Poly(acrylamide-co-2-acrylamido-2-methyl-1-propanesulfonic acid)-Silica Composite

(56) References Cited

OTHER PUBLICATIONS

Nanogels Through in situ Microemulsion Polymerisation," Journal of Materials Science, Feb. 2010, pp. 1008-1016, vol. 45.
Coating Place Inc., Wurster Process Applications, accessed from </wurster-process-applications/wurster-process-applications.htmt> on Jan. 21, 2016, 3 pages.
Coating Place Inc., The Wurster Process, access from </technologies/the-wurster-process.html> on Jan. 21, 2016, 3 pages.
Gomez, F., et al., "Characterization of Polyphosphate Glasses Preparation Using CRTA," Journal of Thermal Analysis and Calorimetry, 1997, pp. 1171-1178, vol. 49, Issue 3.
Powell, R. J., et al., "SPE 28999, Controlled-Release Scale Inhibitor for Use in Fracturing Treatments," Society of Petroleum Engineers, 1995, 9 pages.
Powell, R. J., et al., "SPE 30700, Encapsulated Scale Inhibitor for Use in Fracturing Treatments," Society of Petroleum Engineers, 1995, 7 pages.
Schneider, J., et al., "Local Structure of Sodium Aluminum Metaphosphate Glasses," Journal of the American Ceramic Society, Feb. 2003, pp. 317-324, vol. 86, Issue 2.
Shan, W., et al., "Dissolution Products of a Phosphate Glass Scale Inhibitor and Its Scale Inhibition Mechanism," Glass Technology, 2001, pp. 122-125, vol. 42, No. 4-5.
International Search Report and Written Opinion issued for PCT/US2017/066982 dated Feb. 27, 2018, 18 pages.
Innophos, Safety Data Sheet for Sodium Hexametaphosphate, Apr. 30, 2018, 7 pages.

\* cited by examiner

CONTROLLED RELEASE SOLID SCALE INHIBITORS

CROSS REFERENCE TO RELATED APPLICATIONS

This application claims the benefit of U.S. Provisional Patent Application Ser. No. 62/438,804 filed on Dec. 23, 2016, the disclosure of which is incorporated herein by reference in its entirety.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

REFERENCE TO A SEQUENCE LISTING, TABLE, OR COMPUTER PROGRAM LISTING APPENDIX SUBMITTED ON A COMPACT DISC AND AN INCORPORATION-BY-REFERENCE OF THE MATERIAL ON A COMPACT DISC

Not applicable.

STATEMENT REGARDING PRIOR DISCLOSURES BY THE INVENTOR OR JOINT INVENTORS

Not applicable.

FIELD OF THE INVENTION

Controlled release solid polyphosphate scale inhibitors are provided, as well as their preparation and use in hydraulic fracturing operations in oil and gas wells. More particularly, modified polyphosphate glasses that retain slow dissolution rates at elevated temperatures are provided.

BACKGROUND OF THE INVENTION

It is common in industrial hydraulic fracturing activities to utilize water or aqueous mixtures in the extraction of product. Such fluids are used in various fluid pathways of a hydraulic fracturing system, which include conduits of wellheads and various production tubulars, and conduits of deposit or reservoir wellbores, including distant cracks and fractures in the rock of the deposit or reservoir. A common problem encountered is the formation of scale on the inside surfaces of such conduits.

Water or aqueous mixtures can contain a variety of alkaline earth metal cations, such as calcium, barium and strontium as well as a variety of anions such as bicarbonate, carbonate, sulfate, phosphate and silicate. When such ions are present in sufficient concentrations, they can combine to form precipitates. Scale, formed by the deposition of any of several types of such precipitates can coat surfaces in contact with the water or aqueous mixtures. Buildup of such scale on inside surfaces of conduits can, among other things, obstruct fluid flow. Common scales include calcite, barite, celestite, anhydrite, gypsum, iron sulfide, halite and various "exotic" scales, such as calcium fluorite, zinc sulfide, and lead sulfide sometimes found, for example, within high temperature/high pressure (HT/HP) wells.

The petroleum industry technique known as hydraulic fracturing or, more informally, "hydrofracking" and "fracking," is a widely used and effective method of enhancing the recovery of oil and natural gas from deposits or reservoirs once thought to be difficult or impossible to develop economically. Hydraulic fracturing has been employed in combination with both vertical and horizontal drilling.

Hydraulic fracturing involves injecting a mixture of water, sand or sand-sized particles, and chemical additives into a subsurface petroleum reservoir at high pressure. Injection pressures create small interconnected cracks in the rock and hold open small fractures, about as wide as one or two grains of sand, in the vicinity of the well. These fractures serve as fluid pathways in the reservoir, permitting the fluids in the reservoir to flow more readily to the wellbore.

Scale inhibitors are used in such production wells to prevent scaling in the formation and/or in the production lines downhole and at the surface. Scale build-up decreases permeability of the formation, reduces well productivity and shortens the lifetime of production equipment. In order to clean scales from wells and equipment it is necessary to stop the production which is both time-consuming and costly.

Current scale inhibitors and methods of using such scale inhibitors exhibit a disadvantage in that releasing the inhibitor into the well over a sustained period of time is difficult. As a result, treatments must repeatedly be undertaken to ensure that the requisite level of inhibitor is continuously present in the well. Such treatments result in lost production revenue due to down time.

Scale prevention is important to ensure continuous production from existing reserves. Scale inhibitors and treatment methods for oil and/or gas wells are therefore sought that provide scale inhibiting chemicals that may be released over a sustained period of time. It is desired that such methods not require continuous attention of operators over prolonged periods.

Extensive efforts have been invested into finding chemical additives and methods limiting the dissolution rate of the inhibiting chemicals to achieve the optimal economic recovery of oil or gas. Such efforts continue, indicating a clear need for scale inhibitors and methods of using such inhibitors that exhibit slower, sustained release in the elevated temperature environment of hydraulically fractured oil and gas wells.

BRIEF SUMMARY OF THE INVENTION

A scale inhibitor composition is provided for inhibiting scale in hydraulic fracturing treatment of an oil or gas well, or in industrial water systems. The composition comprises the reaction product of a combination comprising a phosphorus-containing compound, water and a base, the phosphorus-containing compound and the base being in a weight ratio of from 5:1 to about 2:1. The reaction product is in the form of a substantially amorphous glass. The, combination optionally comprises a calcium-containing compound and a magnesium-containing compound. The combination is substantially free of liquid hydrocarbon.

A scale inhibitor composition is provided for inhibiting scale in hydraulic fracturing treatment of an oil or gas well or in industrial water systems. The composition comprises the reaction product of a combination comprising a phosphorus-containing compound, an optional calcium-containing compound, an optional magnesium-containing compound, water, and from 11 to about 25 wt. % base based on the weight of the combination. The reaction product is in the form of a substantially amorphous glass. The combination is substantially free of liquid hydrocarbon.

A scale inhibitor composition is provided for inhibiting scale in hydraulic fracturing treatment of an oil or gas well or in industrial water systems. The composition consists essentially of the reaction product of a combination comprising a phosphorus-containing compound, a calcium-containing compound, a magnesium-containing compound, water, and from 11 to about 25 wt. % base based on the weight of the combination. The reaction product is in the form of a substantially amorphous glass.

A method of preparing the scale inhibitor composition as described above is also provided. The method comprises mixing the phosphorous-containing compound, the calcium-containing compound, the magnesium-containing compound, the base, and the water to form a slurry; heating the slurry to a temperature of at least 600° C. to form a glassy melt; and cooling the glassy melt to form a substantially amorphous glass.

Use of the scale inhibitor composition for inhibiting scale formation in a subterranean formation or in an industrial water system is also provided.

A method of inhibiting scale formation in a subterranean formation is also provided. The method comprises mixing the scale inhibitor composition as described above with a proppant to form a mixture; and injecting the mixture under pressure into hydraulically generated fractures of a wellbore.

A method of inhibiting scale formation in an industrial water system is also provided. The method comprises adding the scale inhibitor composition to an aqueous fluid within the system to inhibit scale formation on a surface of the system which is in contact with the fluid.

Other objects and features will be in part apparent and in part pointed out hereinafter.

DETAILED DESCRIPTION OF THE INVENTION

It has been discovered that the dissolution rate of polyphosphate glasses can be slowed by adjusting the base-to-phosphate-containing compound ratio in the slurried starting materials as compared to a commercially available incumbent product. The scale inhibitor composition is used in oilfield applications wherein temperatures are elevated (greater than 200° F.) such as downhole oil wells where conventional available scale inhibitors release too quickly. The scale inhibitor compositions are sized such that they may be placed into hydraulically generated fractures along with conventional proppants to provide prolonged protection against a range of common oilfield scales (e.g., calcite, barite, etc.) as the polyphosphates slowly dissolve. Unlike conventional infused porous proppants, the polyphosphate glass products can be 100% active.

Without being limited by any particular theory, it is believed that variation of the base to phosphorus-containing compound ratio (such as the $Na_2CO_3$-to-$H_3PO_4$ ratio) results in variation of the length of the polyphosphate chain generated upon heating the slurry to high temperature in a furnace. Variation in the $Na_2CO_3$-to-$H_3PO_4$ ratio is able to slow the rate of dissolution, relative to the unmodified product. This reduced dissolution rate is particularly valuable at temperatures of 300-450° F. where unmodified forms of the incumbent product dissolve into solution at a greater rate than desired.

The composition can comprise the reaction product of a combination. The combination comprises starting materials and the weight of the combination is based upon the weight of the starting materials prior to blending of the starting materials and initiating the reaction.

The weight ratio of phosphate-containing compound to base in the combination can range from 5:1 to about 2:1, preferably from 5:1 to about 2.3:1 or about 4.5:1 to about 2.5:1, and most preferably from about 4:1 to about 2.7:1.

When the combination includes the phosphate-containing compound and the base in the weight ratio described above, the amount of base in the combination can range from about 5 to about 20 wt. %, about 5 to about 15 wt. %, or about 8 to about 15 wt. %.

Regardless of whether the weight ratio of phosphate-containing compound to base in the combination ranges from 5:1 to about 2:1, the combination of phosphorus with from 11 to about 25 wt. % base based on the weight of the combination provides a more chemically robust glass as compared to glass prepared using the same combination of compounds without the base or with less than 11 wt. % base. In use, the scale inhibitors of the invention reduce the rate of dissolution, retain scale inhibition behavior, and minimize the need for changes to the plant production process.

A scale inhibitor composition is provided for inhibiting scale in hydraulic fracturing treatment of an oil or gas well or in industrial water systems. The composition can comprise the reaction product of a combination comprising a phosphorus-containing compound, water, and from 11 to about 25 wt. % base based on the weight of the combination. The reaction product is in the form of a substantially amorphous glass. Preferably, the combination comprises from about 12.5 to about 20 wt. % base, and more preferably, from about 15 to about 20 wt. % base.

Suitable bases include, but are not limited to, sodium hydroxide, potassium hydroxide, ammonium hydroxide, iron hydroxide, barium hydroxide, strontium hydroxide, cadmium hydroxide, cobalt hydroxide, zinc hydroxide, nickel hydroxide, beryllium hydroxide, copper hydroxide, lead hydroxide, chromium hydroxide, mercury hydroxide, trisodium phosphate, sodium carbonate, potassium carbonate, potassium bicarbonate, sodium bicarbonate, sodium borate, potassium acetate, sodium acetate, ammonia, and sodium benzoate. Preferably, the base comprises sodium carbonate, sodium bicarbonate, potassium carbonate, potassium bicarbonate, sodium hydroxide, or potassium hydroxide. For example, the sodium carbonate can be dense soda ash, such as commercially available products containing at least 99 wt. % sodium carbonate.

The phosphorus-containing compound can comprise phosphoric acid, polyphosphoric acid, a phosphate (e.g., an inorganic phosphate such as sodium phosphate, or an organophosphate), an oligophosphate, a phosphate ester, a phosphonate, or a combination thereof. Preferably, the phosphorus-containing compound comprises phosphoric acid.

The composition can comprise from about 20 to about 60 wt. %, from about 20 to about 55 wt. %, about 20 to about 45 wt. %, about 25 to about 35 wt. %, about 40 to about 80 wt. %, about 40 to about 60 wt. %, about 60 to about 80 wt.

%, or about 65 to about 75 wt. % of the phosphorus-containing compound based on the weight of the combination.

The combination can comprise a calcium-containing compound. The calcium-containing compound can comprise any calcium salt such as calcium hydroxide, calcium oxide, calcium carbonate, calcium chloride, or a combination thereof. Preferably, the calcium-containing compound comprises calcium hydroxide such as calcium hydroxide (hydrate).

The composition can comprise from about 1 to about 20 wt. %, about 3 to about 15 wt. %, about 3 to about 12 wt. %, about 5 to about 20 wt. %, about 8 to about 20 wt. %, or about 10 to about 17 wt. % of the calcium-containing compound based on the weight of the combination.

The combination can comprise a magnesium-containing compound. The magnesium-containing compound can comprise any magnesium salt such as magnesium hydroxide, magnesium oxide, magnesium carbonate, magnesium chloride, or a combination thereof. Preferably, the magnesium-containing compound comprises magnesium hydroxide.

The composition can comprise from about 1 to about 15 wt. %, about 2 to about 10 wt. %, about 4 to about 9 wt. %, about 5 to about 15 wt. %, about 7 to about 12 wt. %, or about 8 to about 10 wt. % of the magnesium-containing compound based on the weight of the combination.

The water is preferably deionized water. The composition comprises from about 1 to about 65 wt. %, about 5 to about 60 wt. %, about 10 to about 60 wt. %, about 25 to about 55 wt. %, about 1 to about 35 wt. %, about 2 to about 20 wt. %, about 2 to about 10 wt. %, or about 4 to about 6 wt. % water based on the weight of the combination. The water content of the combination may be varied as needed to produce a slurry with desired rheological and handling properties.

When the weight ratio of the phosphorus-containing compound to the base in the combination ranges from 5:1 to about 2:1, the combination of the scale inhibition composition can comprise from about 20 to about 60 wt. % of the phosphorus-containing compound, from about 5 to about 20 wt. % of the base, about 1 to about 65 wt. % water, about 1 to about 20 wt. % of the calcium-containing compound, and about 1 to about 15 wt. % of the magnesium-containing compound.

When the weight ratio of the phosphorus-containing compound to the base in the combination ranges from 5:1 to about 2:1, the combination of the scale inhibition composition can comprise from about 20 to about 55 wt. % of the phosphorus-containing compound, about 5 to about 15 wt. % of the base, about 5 to about 60 wt. % water, about 1 to about 20 wt. % of the calcium-containing compound, and about 1 to about 15 wt. % of the magnesium-containing compound.

When the weight ratio of the phosphorus-containing compound to the base in the combination ranges from 5:1 to about 2:1, the combination of the scale inhibition composition can comprise from about 20 to about 45 wt. % of the phosphorus-containing compound, about 8 to about 15 wt. % of the base, about 10 to about 60 wt. % water, about 3 to about 15 wt. % of the calcium-containing compound, and about 2 to about 10 wt. % of the magnesium-containing compound.

When the weight ratio of the phosphorus-containing compound to the base in the combination ranges from 5:1 to about 2:1, the combination of the scale inhibition composition can comprise from about 25 to about 35 wt. % of the phosphorus-containing compound, about 8 to about 15 wt. % of the base, about 25 to about 55 wt. % water, about 3 to about 12 wt. % of the calcium-containing compound, and about 4 to about 9 wt. % of the magnesium-containing compound.

A combination of the scale inhibition composition can comprise from about 40 to about 60 wt. % of the phosphorus-containing compound, from about 11 to about 25 wt. % of the base, about 1 to about 35 wt. % water, about 1 to about 20 wt. % of the calcium-containing compound, and about 1 to about 15 wt. % of the magnesium-containing compound.

The scale inhibitor composition can comprise the reaction product of a combination consisting essentially of a phosphorus-containing compound, a calcium-containing compound, a magnesium-containing compound, water, and from 11 to about 25 wt. % base based on the weight of the combination. The reaction product is in the form of a substantially amorphous glass.

The scale inhibitor composition can comprise the reaction product of a combination that is substantially free of liquid hydrocarbon, or free of liquid hydrocarbon.

The scale inhibitor composition can include or be combined with one or more further components or ingredients, examples of which include solvents, excipients, diluents, and additives, such as an aluminum-containing compound for controlling dissolution rate, a biocide, a stabilizer, a surfactant, a corrosion inhibitor, other scale inhibitors, and an antifoaming agent.

The composition can comprise an aluminum-containing compound comprised of alumina such as 1% basic alumina, aluminum hydroxide, aluminium oxide hydroxide, a naturally occurring or synthetic alumina-containing mineral such as corundum, ruby, sapphire, bauxite, gibbsite, boehmite or diaspore or a polymorph thereof, an aluminate salt such as an aluminum halide, nitrate, phosphate/metaphosphate or a polymorph thereof, an organic aluminum such as an trialkylaluminum compound, or a combination thereof. Preferably, the aluminum-containing compound comprises alumina, aluminum hydroxide, or a combination thereof. The composition can comprise from about 2 to about 10 wt. % or about 3 to about 6 wt. % of the aluminum-containing compound based on the weight of the combination. Compositions containing an aluminum-containing compound are described in U.S. Patent Application Publication No. US 2017/0158945 A1, entitled "Controlled Release Solid Scale Inhibitors", which is incorporated herein by reference in its entirety.

The substantially amorphous glass can be in the form of a particulate having a coating on at least a portion of the surface of the particulate, the coating comprising a water-insoluble polymer, a water-insoluble particulate, or a combination thereof. The coating weight is about 0.01 wt. % to 90 wt. %, about 5 wt. % to about 25 wt. %, or about 5 wt. % to about 15 wt. % of the mass of the coated particulate. The water insoluble polymer can comprise polyvinyl chloride, polyvinylidene chloride, poly(alkyl acrylate), polyethylene terephthalate, polyethylene, polypropylene, polyacrylonitrile, poly(acrylonitrile-butadiene-styrene), styrene-butadiene rubber, polydimethylsiloxane, polytetrafluoroethylene, polycarbonate, polylactic acid, polyimide, polyaramide, polyurethane, poly(ether-ether ketone), epoxy polymer, an interpolymer of two or more thereof, a mixture thereof, or crosslinked derivative thereof. Preferably, the water insoluble polymer comprises polyvinylidene chloride or an interpolymer thereof with methyl acrylate. Such coatings are described in U.S. Patent Application Publication No. US 2017/0327727 A1, entitled "Slow Release Scale Inhibiting Compositions", which is incorporated herein by reference in its entirety.

The substantially amorphous glass can be in the form of amorphous glass particles sized for insertion into fractures of hydraulically fractured wells along with conventional proppants to minimize the number of treatments needed and cause less downtime. The substantially amorphous glass can be in the form of a pelletized solid that can be included with the proppant packages commonly used in hydraulic fracturing operations. The substantially amorphous glass particles can have an average size of about 150 µm to about 2,000,000 µm, and can have a size of at least 100 mesh.

The substantially amorphous glass can dissolve at a rate of loss of less than 60% of the starting total mass over a 28 day period, when heated to 300° F. in deionized water at a concentration of 5 g slowed release polyphosphate glass per 300 mL deionized water. The scale inhibitor composition exhibits a reduced and sustained dissolution rate profile as compared to conventional polyphosphate glass products.

The scale inhibitor, as the polyphosphates slowly dissolve, further provides prolonged protection against a range of common oilfield scales, including, for example, calcite, barite, celestite, anhydrite, gypsum, iron sulfide, halite and various "exotic" scales, such as calcium fluoride, zinc sulfide, and lead sulfide sometimes found in high temperature/ high pressure (HT/HP) wells.

The scale inhibitor compositions with 11-25 wt. % base are suitable for hydraulically fractured wells and exhibit a reduced dissolution rate profile compared to an equal amount of essentially the same scale inhibitor composition with 10 wt. % base.

A method of preparing the scale inhibitor composition as described above is also provided. The method comprises mixing the phosphorous-containing compound, the calcium-containing compound, the magnesium-containing compound, the base, and the water to form a slurry; heating the slurry to a temperature of at least 600° C. to form a glassy melt; and cooling the glassy melt to form a substantially amorphous glass. Preferably, the order of addition in preparing the slurry is to add the acid components to a small amount of water, then to add the basic components to the aqueous acid, then to add the balance of water.

The method can further comprise grinding the substantially amorphous glass into particles sized for insertion into fractures of hydraulically fractured wells and having a size of at least 100 mesh.

The components that form the slurry or combination described herein undergo a first reaction when mixed and a second reaction when heated and melted, forming a glassy melt. For example, phosphoric acid, calcium hydroxide, magnesium hydroxide and the base can be mixed, resulting in neutralization of the phosphoric acid with the calcium hydroxide, magnesium hydroxide and base. The exothermic neutralization produces phosphate salts and water.

Water content may be varied as needed to produce a slurry with the desired viscosity. The solubility may be altered by varying the levels of the calcium containing compound and/or the magnesium-containing compound. Increasing the amount of the calcium and/or magnesium-containing compound in the combination decreases solubility.

Further chemicals can be included in the slurry, such as a surfactant to eliminate foam formation during preparation of the slurry or a rheological modifier to adjust rheological properties of the slurry. Further chemicals can include coloring agents to produce a desired final color.

The slurry is heated to a high temperature to form a glassy melt. For example, the slurry can be pumped into a high temperature furnace and heated to a temperature of at least 600° C. or at least 600° C. The slurry can be heated at a temperature ranging from 600 and 2500° C., preferably from 1100 to 2500° C. or 1500 and 2500° C. The heating and melting can be accomplished in any conventional manner used in the preparation of glasses, including in a furnace, an electric melter, pot furnace or kiln. Although a temperature of 600° C. is sufficient to form a glassy melt, heating the melt to a greater temperature prevents premature solidification during processing of the glassy melt, drives off volatile components, and drives condensation of the phosphoric acid.

The molten glass can be homogenized and bubbles can be removed by stirring the slurry to a consistent thickness.

During the heating, components of the slurry undergo a second reaction and form a glassy melt. The glassy melt can be cooled or annealed, thereby forming a substantially amorphous glass. The rate of cooling the glassy melt can vary. For example, the glassy melt can be cooled at a rate of at least 150° C./min. As another example, the glass can be cooled as rapidly as practically possibly so as to prevent crystallization and/or phase separation.

The heated and cooled composition can form a polyphosphate glass product. The product can be a substantially amorphous, glassy product with a complex chemical and physical structure.

The polyphosphate glassy product can be in the form of a sheet.

The polyphosphate amorphous glass product can be processed by crushing and grinding and sieving to glass particles of a desired size. The glass particles of the final product can be of an average size that can be placed into hydraulically generated fractures.

Proppants can be included in the crushing, grinding or sieving steps. Preferably, the glass particle product is mixed with proppant on-site before the proppant is injected into hydraulically generated fractures of a wellbore.

The polyphosphate amorphous glass can be crushed or ground and sieved to a grain consistency, using, for example, grinders or crushers.

The grain/particle size of the substantially amorphous glass final product can be at least 100 mesh, from about 10 to about 70 mesh, from about 10 to about 30 mesh or from about 40 to about 70 mesh. The size range is a function of the grinding and sieving methods used and can be adjusted to suit the particular application.

The glass particles form a slow-release material that has both scale inhibition properties and exhibits a reduced dissolution rate profile compared to an equal amount of essentially the same material with 10 wt. % base. The rate of dissolution of the substantially amorphous glass particles is maintained at elevated, moderate or low temperatures. Elevated temperatures include at least 200° F.; moderate temperatures include 150-199° F.; and low temperatures include temperatures less than 150° F. For example, the substantially amorphous glass particles of the scale inhibitor can be utilized with intended controlled release effect in environments having temperatures of 170-450, 200-450 or 300-450° F., and maintain its rate of dissolution.

If the glass particles are coated with a coating comprising a water-insoluble polymer, a water-insoluble particulate, or a combination thereof as described above, the method of making the scale inhibitor composition can further comprise applying the coating on a surface of the scale inhibitor composition while the particle is within a fluidized bed reactor, optionally drying the coated particulate and collecting the coated particulate. The coating can be applied as an emulsion, dispersion or solution.

In some instances, the substantially amorphous glass product is not ground or crushed and remains in the form of much larger pieces. Such pieces can be positioned somewhere in a well other than in hydraulically generated fractures and can therefore be much larger. Non-limiting examples of such places include somewhere in the wellbore casing or the rathole. For example, the substantially amorphous glass product can be in the form of pieces having a size of 1 cm or more, 10 cm or more, or 100 cm or more.

The scale inhibitor composition can be prepared as a dry product of various forms, for example, beads, granules, or particles. The product has the advantage that it can be pumped and handled as a solid in fracturing operations and can be packaged.

A method of inhibiting scale formation in a subterranean formation is also provided. The method comprises either injecting the scale inhibitor composition under pressure into a wellbore (e.g., the rathole or downhole tools or assemblies) or formation, mixing the scale inhibitor composition as described above with a proppant to form a mixture and injecting the mixture under pressure into the wellbore or formation, or pumping the scale inhibitor composition (blended or unblended with other solids or additives) into the wellbore or formation. Typically, the composition is in contact with hydraulically generated fractures of a wellbore or formation.

The mixture can include water, sand or sand-sized particles, and various other chemical additives.

The mixture can be introduced into a production wellbore. When hydraulic fracturing has been employed in either vertical or horizontal drilling, the mixture can be introduced under pressure into fractured fissures of the wellbore.

The scale inhibitor composition can be forced into a subterranean formation by application of hydraulic pressure from the surface which forces the composition into a targeted zone. Such treatments can be performed at downhole injection pressures below that of the formation fracture pressure. Alternatively, a delivery method can consist of placing the solid inhibitor into the producing formation in conjunction with a hydraulic fracturing operation. This method places the inhibitor in contact with the fluids contained in the formation before such fluids enter the wellbore where scaling is commonly encountered.

In applications involving hydraulic fracturing, application can involve injecting the mixture into a subsurface petroleum reservoir at high pressure. Injection pressures create small interconnected cracks in the rock and hold open small fractures, about as wide as one or two grains of sand, in the vicinity of the well. These fractures serve as fluid pathways in the reservoir, permitting the fluids in the reservoir to flow more readily to the wellbore.

When in place, the scale inhibitor composition is released over a sustained period of time, providing prolonged protection. Less frequent shut downs and added treatments are needed to ensure that the requisite level of inhibitor is continuously present in the well as compared to conventional methods. This lessens lost production revenue due to down time.

The sustained level of concentration of solid scale inhibitor due to the slowed release is such that scale inhibitor is also released into the flowback to treat scale in the fracturing fluid water.

The scale inhibitor composition can be applied in continuous feeding which can be periodically shut down to remove existing scale and to add a new dose/aliquot of the composition. Alternatively, the slow, sustained release exhibited by the scale inhibitor composition provides greater overall efficiency than the continuous chemical injection and/or less frequent shut downs as compared with conventional scale inhibitor compositions.

Application amounts can vary on a case-by-case basis and can be adjusted as necessary according to perceived results. For example, the concentration of the scale inhibitor composition in the total amount of proppant placed into a fracture is about 0.001 to about 50 wt. %, about 0.1 to about 20 wt. %, or about 1 to about 10 wt. %.

The scale inhibitor composition can be substantially free of solvents or surfactants. This is an advantage over liquid scale inhibitors in applications where very little reservoir water is produced.

Scale formation (particularly calcite and barite) is a ubiquitous challenge in any area where water/brines are part of a process. Processes that incorporate water temperature or pressure changes (e.g., heat exchangers, cooling towers, etc.) or mixing of waters that have different salt contents are particularly prone to scale formation. The scale inhibitor compositions and methods of the invention can be utilized in such applications.

Other applications for the scale inhibitor compositions include industrial water systems, transportation pipelines, water softeners and waste water treatment equipment. Examples of industrial water systems include, but are not limited to, cooling towers, paper mills, metal working fluids, metal and/or mineral mining systems, heat exchangers, reinjection water such as produced water from oil production, flooding water used in secondary oil recovery, geothermal systems, fluid coolers, hydrotesting of pipelines, water treatment or purification plants and equipment, including reverse osmosis membranes, ultrafiltration or ion exchange.

A method of inhibiting scale formation in an industrial water system is also provided. The method comprises adding the scale inhibitor composition to an aqueous fluid within the system to inhibit scale formation on a surface of the system which is in contact with the fluid. The surface can be within a heat exchanger, a cooling tower, a pipeline, a water softener, a waste water treatment system, a paper mill, a mining system, a geothermal system, a fluid cooling system, a water treatment plant, a water purification plant, a wastewater treatment plant, a reverse osmosis membrane, a ultrafiltration system or an ion exchanger.

The scale inhibitor compositions as described herein are also effective in inhibiting corrosion in the same systems as described herein.

Definitions

Unless otherwise defined herein, all technical and scientific terms used herein have the same meaning as commonly understood by one of ordinary skill in the art. In case of conflict, the present document, including definitions, will control.

"Alumina" refers to aluminium oxide and is a chemical compound of aluminium and oxygen with the chemical formula $Al_2O_3$. It is also referred to as aluminium(III) oxide, aloxide, aloxite, and alundum.

"Consisting essentially of" means that the specified combination includes the specified ingredients as well as additional unspecified ingredients provided that the unspecified ingredients do not materially affect the basic and novel characteristics of the composition. More specifically, the unspecified ingredients cannot include an amount of a liquid hydrocarbon such as fuel oil, or any ingredient that would adversely affect the dissolution rate of the scale inhibitor composition as compared to the same composition made from a combination that does not include that ingredient in the combination when made under the same conditions.

"Oilfield" as used herein refers to the surface area overlying an oil reservoir or reservoirs, and the reservoir(s), well(s) and production equipment associated therewith.

"Pipeline" as used herein refers to a tube or system of tubes used for transporting crude oil and natural gas from the field or gathering system to the refinery.

"Production" refers to the phase of the petroleum industry that deals with bringing well fluids or gas to the surface and separating them and storing, gauging and otherwise preparing the product for delivery; also can refer to the amount of oil or gas produced in a given period.

"Production tubing" refers to a wellbore tubular used to produce reservoir fluids. Production tubing is assembled with other completion components to make up the production string. The production tubing selected for any completion should be compatible with the wellbore geometry, reservoir production characteristics and reservoir fluids.

"Proppant" refers to a solid material, typically sand, treated sand or man-made ceramic materials, designed to keep an induced hydraulic fracture open, during or following a fracturing treatment. It is added to a fracking fluid which may vary in composition depending on the type of fracturing used, and can be gel, foam or slickwater-based.

"Oxide" refers to a chemical compound that contains at least one oxygen atom and one other element in its chemical formula.

"Substantially amorphous glass" means a glass which contains less than 50 wt. % crystalline material, preferably less than 45, 40, 35, 30, 25, 20, 15, 10, or 5 wt. % crystalline material.

"Substantially free" of liquid hydrocarbon means that the specified combination contains less than 10 wt. % liquid hydrocarbon, preferably less than 5 wt. % liquid hydrocarbon, and most preferably less than 1 wt. % liquid hydrocarbon.

"Tubular" or "Tubulars" refers to any type of oilfield pipe or oilfield tubular goods, such as drill pipe, drill collars, pup joints, casing, production tubing/line and pipeline or line pipe. The term includes standard and line pipe used in the oil and gas, pipeline, construction, refining, chemical and petrochemical industries for production and transmission of crude oil, natural gas and petroleum products as well as for water and slurry pipeline applications.

"Valve" or Valve component" refers to any device for halting or controlling the flow of a liquid, gas or other material through a passage, pipe, inlet, outlet, etc.

"Wellbore" refers to a borehole; the hole drilled by the bit. A wellbore may have casing in it or it may be open (uncased); or part of it may be cased, and part of it may be open; also called well, borehole or hole.

"Wellhead" refers to the equipment installed at the surface of the wellbore. A wellhead includes such equipment as the casing head and tubing head.

It will be apparent that modifications and variations are possible without departing from the scope of the invention defined in the appended claims.

EXAMPLES

The following non-limiting examples are provided to further illustrate the invention.

Examples 1-16: Preparation of Scale Inhibitor Composition

The general procedure for preparing a polyphosphate glass involves the formation of a homogeneous slurry that contains all of the base components of the glass as described herein, followed by transfer of the slurry into a high temperature furnace heated to approximately 1150° C. For large scale production, this is done in large, cylindrical furnaces that are heated by gas burners. On a lab scale, this was done in a small, benchtop electrical muffle furnace. A lab-scale version of this process was developed using small, ceramic crucibles (either 100 mL or 250 mL). When using a 100 mL crucible, the slurry was scaled to 50 g to allow sufficient head space in the crucible to accommodate volume expansion during the early stages of heating in the furnace. When using a 250 mL crucible, the slurry was scaled to 150 g. The slurry components were blended in the following order: small quantity of deionized water (~10% of total water volume), phosphorus-containing compound, base, calcium-containing compound, magnesium-containing compound, and balance of water.

Representative formulations for a slurry used in forming a scale inhibitor composition of the invention are shown in Table 1:

TABLE 1

| | | Example | | | | | | | |
|---|---|---|---|---|---|---|---|---|---|
| Component | | 1 | 2 | 3 | 4 | 5 | 6 | 7 | 8 |
| Phosphorus-Containing Compound (wt. %) | Phosphoric acid, 80% | 63.5 | 57.63 | 45.61 | 58.5 | 57.3 | 54.8 | 48.76 | 49.8 |
| Calcium-Containing Compound (wt. %) | Calcium Hydroxide, hydrated | 5 | 7.5 | 4.15 | 11 | 11.42 | 10.44 | 4.31 | 6.03 |
| Magnesium-Containing Compound (wt. %) | Magnesium Hydroxide, technical grade | 15 | 12.37 | 11.11 | 10.32 | 9.14 | 7.26 | 7.53 | 2.47 |
| Base (wt. %) | Dense soda ash | 0 | 12.5 | 9.13 | 0 | 17.5 | 0 | 0 | 10 |
| | Potassium Hydroxide | 11 | 0 | 0 | 0 | 0 | 0 | 0 | 0 |
| | Sodium Hydroxide | 0 | 0 | 0 | 0 | 0 | 0 | 14.4 | 0 |

TABLE 1-continued

|  |  | | | | | | | | |
|---|---|---|---|---|---|---|---|---|---|
|  | Potassium Bicarbonate | 0 | 0 | 0 | 16.5 | 0 | 0 | 0 | 0 |
|  | Sodium Bicarbonate | 0 | 0 | 0 | 0 | 0 | 20 | 0 | 0 |
| Solvent (wt. %) | Water | 5.5 | 10 | 30 | 3.68 | 4.64 | 7.5 | 25 | 31.7 |
|  | Total | 100 | 100 | 100 | 100 | 100 | 100 | 100 | 100 |

| | | Example | | | | | | |
|---|---|---|---|---|---|---|---|---|
| Component | | 9 | 10 | 11 | 12 | 13 | 14 | 15 | 16 |
| Phosphorus-Containing Compound (wt. %) | Phosphoric acid, 80% | 51.19 | 45.07 | 42.67 | 40.26 | 37.86 | 34.22 | 30.57 | 26.93 |
| Calcium-Containing Compound (wt. %) | Calcium Hydroxide, hydrated | 10.20 | 8.98 | 8.50 | 8.02 | 7.54 | 6.82 | 6.09 | 5.37 |
| Magnesium-Containing Compound (wt. %) | Magnesium Hydroxide, technical grade | 8.17 | 7.19 | 6.81 | 6.42 | 6.04 | 5.46 | 4.88 | 4.30 |
| Base (wt. %) | Dense soda ash | 15.63 | 13.76 | 13.02 | 12.29 | 11.56 | 10.45 | 9.34 | 8.23 |
| Solvent (wt. %) | Water | 14.81 | 25 | 29 | 33.01 | 37 | 43.05 | 49.12 | 55.18 |
|  | Total | 100 | 100 | 100 | 100 | 100 | 100 | 100 | 100 |

The slurry of Example 5 was homogenized using an overhead stirrer and cooled on an ice bath to prevent boiling during the exothermic addition of the basic components to the phosphoric acid. The reaction was relatively insensitive to the amount of water incorporated into the slurry since the water was vaporized during heating in the furnace. Water was added as needed to maintain a stirrable and pourable slurry (e.g., viscosity less than 2000 cP).

After sufficient homogenization, the slurry was poured into the crucible and the crucible was placed into a cool muffle furnace. The furnace temperature was increased according to the profile shown in Table 2. Most of the water boiled off during the first two temperature segments, while the solids melted and formed the glass during and after the ramp to 1150° C. The transition from 250° C. to 1150° C. may be slow, depending on the furnace. For the small muffle furnace used in this study, the transition took approximately 2 hours, for a total furnace time of 5-6 hours. If a commercial scale furnace is used, the furnace is preheated so no transition time is required.

TABLE 2

| Temperature (° C.) | Hold Time (min) |
|---|---|
| 150 | 45 |
| 250 | 45 |
| 1150* | 120 |

After heating for the prescribed period of time, the furnace was shut off and the molten glass was poured from the crucible into a stainless steel pan that was immersed in an external, ambient temperature water bath to promote rapid cooling. Samples typically fractured during the cooling process due to buildup of significant internal stresses. The glass was contained during the cooling process by covering the sample with a second pan or lid.

Once the sample cooled, it was ground and sieved to the required size. For the purposes of this study, the same was sized to a range of 10-30 mesh.

The comparative composition used in the study was a commercial product available from Nalco Champion, an Ecolab Company, of Fresno, Tex., which is made from an aqueous slurry including a phosphate-containing compound and less than 7 wt. % soda ash based on the weight of the starting materials used to form the slurry (the slurry having a weight ratio of phosphate-containing compound to base of about 8:1). The comparative product was sized to a range of 10-30 mesh.

Example 17: 200° F. Dissolution Study

Method A. For long term studies at 200° F., 3-5 grams of a polyphosphate sample were placed in a porous sample pouch. At 200° F., a stainless steel wire mesh pouch (100 mesh screen) was loaded with the sample, and sealed with copper wire. Stainless steel tags were used to identify the samples during the tests. The bagged samples were placed in a 1 L round bottom flask that was held in a suitably sized heating mantle. The flask was filled with 500 mL deionized water, sealed with a stopper through which a thermocouple was inserted to monitor the solution's temperature, and heated to 200° F. All of the bagged samples were tested in a single flask. Incumbent product was included in all flasks to serve as an internal standard. The flask was not stirred during the test. At the times indicated in the dissolution rate plots (FIG. 1), the flask was cooled, the samples were removed and air dried, and their masses were recorded. The flask was then refilled with fresh water, the samples were added, the flask was sealed and heated, and the test was continued.

In a preliminary series of experiments, three polyphosphate samples were prepared with increased soda ash concentrations in the manner described in Example 5. While the incumbent comparative formulation contained approximately 6.5% soda ash, the new formulations were prepared with 10%, 12.5%, or 15% soda ash as shown in Table 3. As compared to the amounts in the slurry of Table 1, the offset for this increased soda ash was provided by reducing the amount of phosphoric acid. The calcium hydroxide, magnesium hydroxide, and water concentrations were left unchanged as compared to Example 5 of Table 1. The samples were sized to a range of 10-30 mesh, and were subjected to an 8-week dissolution rate study in deionized water at 200° F. according to Method A above.

TABLE 3

| Sample | Soda Ash Concentration | Phosphoric Acid Concentration |
|---|---|---|
| DRD 7444.192.1 | 10.0% | 64.8% |
| DRD 7444.197.1 | 12.5% | 62.3% |
| DRD 7444.199.1 | 15.0% | 59.8% |

Figure 1:
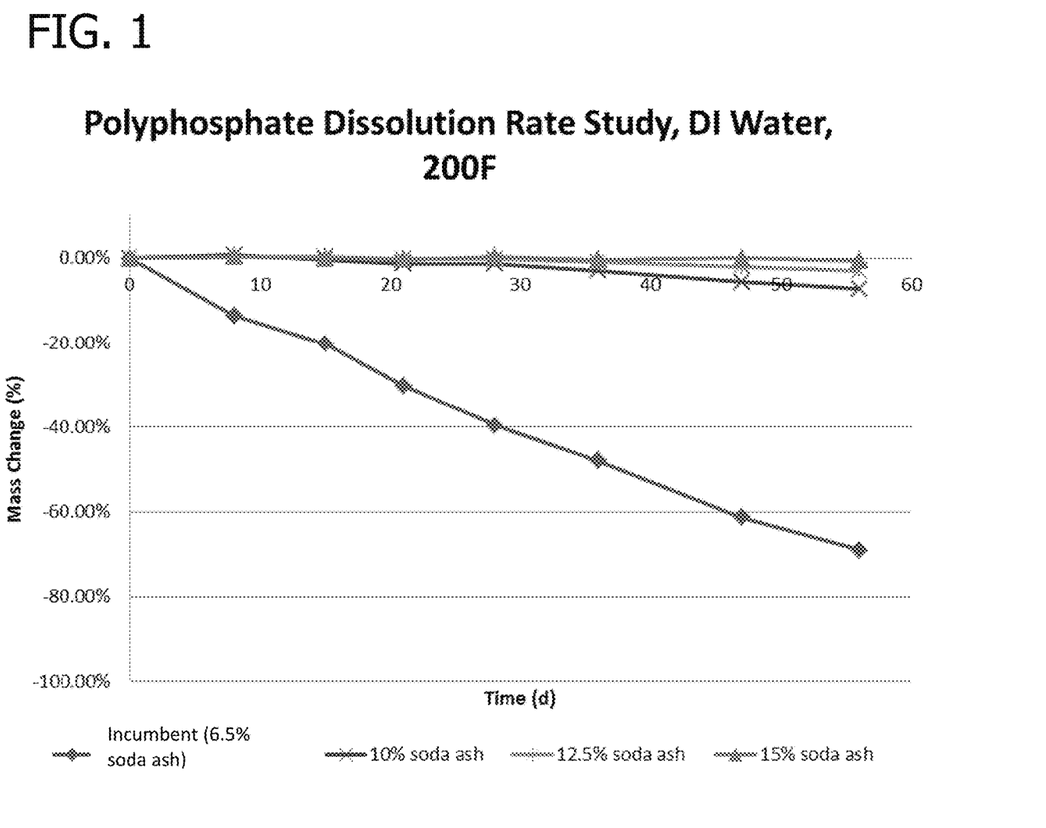
FIG. 1 is a graph depicting mass change (%) over time for a dissolution study at 200° F. for various polyphosphate glasses.

As shown in FIG. 1, the incumbent product dissolved relatively quickly, losing roughly 70% of its mass over the course of the 8-week experiment. The inventive samples with increased soda ash concentration showed less than 10% mass loss over the course of the study. In fact, the dissolution rates of these samples were so low at 200° F. that it was difficult to distinguish between the samples; the curves essentially overlapped one another. A higher temperature dissolution study was then completed to differentiate the samples.

Example 18: 300° F. Dissolution Study

Method B. For long term studies at higher temperatures (greater than 200° F.), a similar heating procedure to Method A was used at elevated temperatures, except that a 500 mL OFITE stainless steel HTHP aging cell was substituted for the round bottom flask, heating was achieved by placing the cells in an oven (rather than using a heating mantle), and the fluid volume was reduced from 500 mL to 300 mL. The test cells were cooled in a water bath upon removal from the oven to speed up the process.

Figure 2:
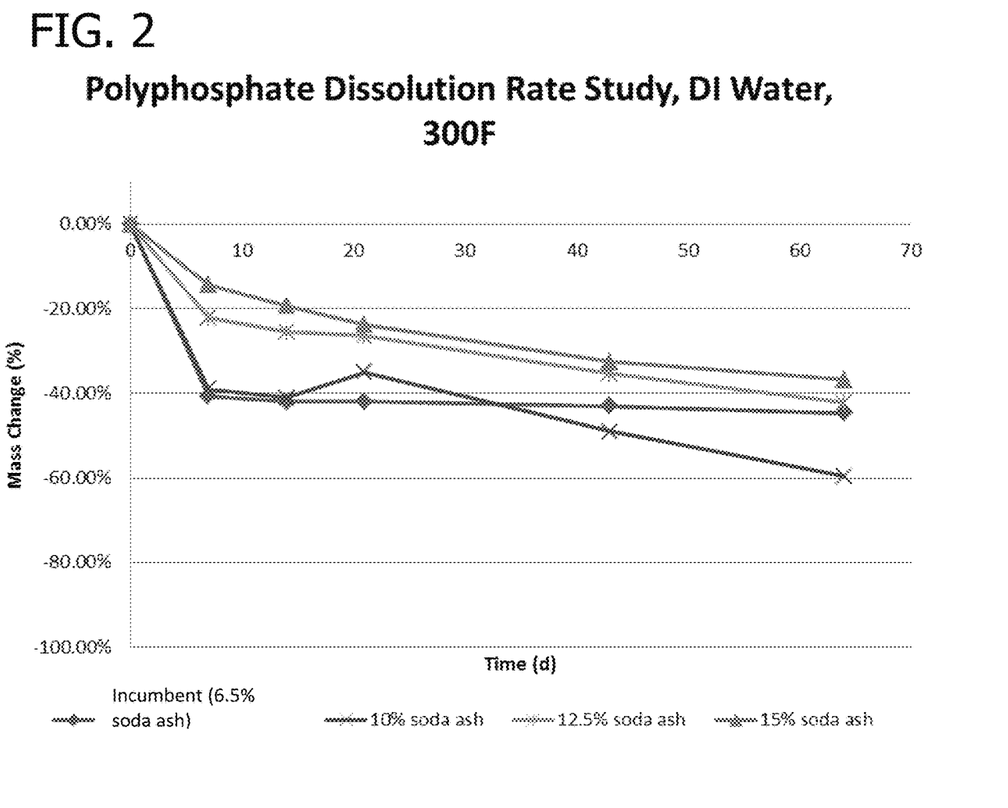
FIGS. 2 and 3 are graphs depicting mass change (%) over time for dissolution studies at 300° F. for various polyphosphate glasses.

A dissolution study incorporating the same sample set as in Example 17 was performed at 300° F. in deionized water according to Method B. As shown in FIG. 2, all of the samples dissolved considerably more quickly than they did at 200° F.

The incumbent product dissolved considerably more slowly in the 300° F. test (60% mass loss over 9 weeks) than it did in the 200° F. test (80% mass loss over 8 weeks). One possible explanation for this is that the sample achieved saturation in the test brine. Given the relatively small amount of material used in the test and the slow dissolution rates, however, this seemed unlikely. A more likely explanation is that the samples were dynamically interacting with one another since they were contained within a single closed vessel. Dissolution of the samples of Table 3 prepared with increased soda ash was so slow that the incumbent product was free to dissolve, unaffected by the presence of the highly stable polyphosphate species. In contrast, at higher temperature, the samples with increased soda ash dissolved much more quickly, and had a net stabilizing effect on the incumbent product. The stabilization mechanism was not clear, but ion metathesis from the increased soda ash samples to the incumbent product seems most likely. Segregation of the samples into separate test vessels, although more time consuming, would most likely address this issue of sample interaction and provide a clearer picture of the true, unadulterated dissolution rate of each sample.

Regardless, the samples prepared with increased soda ash concentrations uniformly dissolved more slowly than the comparative incumbent product throughout the course of the experiment. Moreover, dissolution rate was inversely related to soda ash concentration: the sample with 10.0% soda ash dissolved more rapidly than the sample with 12.5% soda ash, which in turn dissolved more rapidly than the sample with 15.0% soda ash. These data suggested that an optimized soda ash concentration remained to be determined to minimize the dissolution rate as much as possible.

Example 19: 300° F. Dissolution Study at Various Soda Ash Concentrations

To examine the effect of soda ash concentration in minimizing the dissolution rate, four new polyphosphate samples were prepared as described in Example 5 with soda ash concentrations ranging from 15.0% to 25.0% (see Table 4) for a 300° F. dissolution study in deionized water.

TABLE 4

| Sample | Soda Ash Concentration | Phosphoric Acid Concentration | Peak Dissolution at Experiment End |
|---|---|---|---|
| DRD 7444.199.1 | 15.0% | 59.8% | 23.5% |
| DRD 7643.22.1 | 17.5% | 57.3% | 14.9% |
| DRD 7643.29.1 | 20.0% | 54.8% | 18.4% |
| DRD 7643.32.1 | 22.5% | 52.3% | 27.8% |
| DRD 7643.36.1 | 25.0% | 49.8% | 33.3% |

Figure 3:
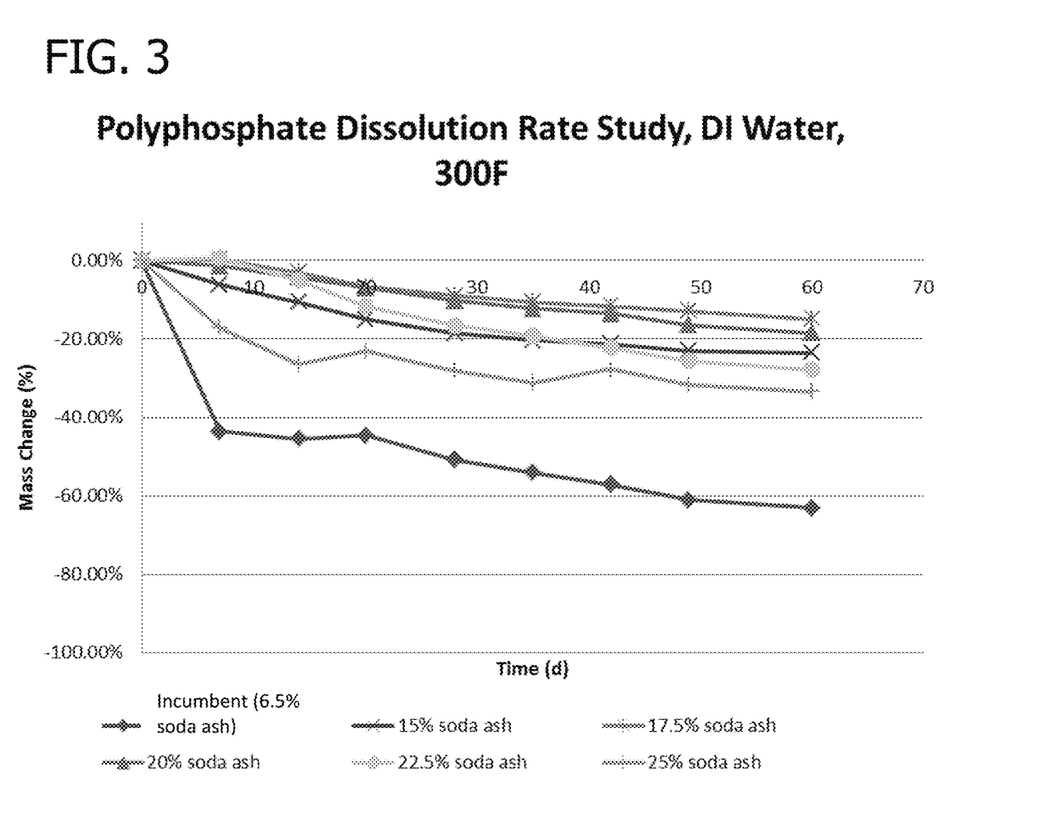

As shown in FIG. 3, the incumbent product dissolved rapidly, as expected. The samples with increased soda ash dissolved much more slowly, and were able to be distinguished from one another. Additionally, it was apparent that there is an optimal soda ash concentration (17.5%) where the dissolution rate of the polyphosphate is minimized. At either higher or lower concentrations, the total amount of mass loss (and as a result, the overall dissolution rate) is greater. This soda ash to phosphoric acid ratio represents an optimized soda ash concentration for this particular blend of components. Further optimization of the calcium hydroxide and/or magnesium hydroxide, and subsequent re-optimization of the soda ash concentration, may result in a product with a further reduced dissolution rate.

Example 20: Preparation of Scale Inhibitor Composition

The slurry of Example 13 was homogenized using an overhead stirrer and cooled on an ice bath to prevent boiling during the exothermic addition of the basic components to the phosphoric acid. The reaction was relatively insensitive to the amount of water incorporated into the slurry since the water was vaporized during heating in the furnace. Water was added as needed to maintain a stirrable and pourable slurry (e.g., viscosity less than 2000 cP).

After sufficient homogenization, the slurry was poured into the crucible and the crucible was placed into a cool muffle furnace. The furnace temperature was increased according to the profile shown in Table 2. Most of the water boiled off during the first two temperature segments, while the solids melted and formed the glass during and after the ramp to 1150° C. The transition from 250° C. to 1150° C. may be slow, depending on the furnace. For the small muffle furnace used in this study, the transition took approximately 2 hours, for a total furnace time of 5-6 hours. If a commercial scale furnace is used, the furnace is preheated so no transition time is required.

After heating for the prescribed period of time, the furnace was shut off and the molten glass was poured from the crucible into a stainless steel pan that was immersed in an external, ambient temperature water bath to promote rapid cooling. Samples typically fractured during the cooling process due to buildup of significant internal stresses. The glass was contained during the cooling process by covering the sample with a second pan or lid. Once the sample cooled, it was ground and sieved to the required size.

The slurry of Example 16 was made by the same process.

When introducing elements of the invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above compositions and processes without departing from the scope of the invention, it is intended that all matter contained in the above description and shown in the accompanying drawings shall be interpreted as illustrative and not in a limiting sense.

What is claimed is:

1. A method of inhibiting scale formation in a subterranean petroleum formation, the method comprising:
   mixing a scale inhibitor composition with a proppant to form a mixture; and
   injecting the mixture under pressure into hydraulically generated fractures of a wellbore, the scale inhibitor composition comprising a reaction product of a combination comprising from about 20 to about 55 wt. % of a phosphorus-containing compound, about 1 to about 20 wt. % of a calcium-containing compound, about 1 to about 15 wt. % of a magnesium-containing compound, water, and from 11 to about 25 wt. % of a sodium- or potassium-containing base, based on the weight of the combination, the reaction product being in the form of a substantially amorphous glass, and the combination being substantially free of liquid hydrocarbon, and wherein the sodium- or potassium-containing base comprises sodium hydroxide, potassium hydroxide, trisodium phosphate, sodium carbonate, potassium carbonate, potassium bicarbonate, sodium bicarbonate, potassium acetate, sodium acetate, sodium benzoate, or a combination thereof; the phosphorus-containing compound and the sodium- or potassium-containing base being in a weight ratio of from 5:1 to 2:1,
   wherein the substantially amorphous glass is particulate and has a particle size of from about 10 to about 30 mesh and whereby scale formation in the subterranean petroleum formation is inhibited.

2. The method of claim 1, wherein the weight ratio is from 5:1 to about 2.3:1.

3. The method of claim 1, wherein the weight ratio is from about 4:1 to about 2.7:1.

4. The method of claim 1, wherein the phosphorus-containing compound comprises phosphoric acid, polyphosphoric acid, a phosphate, a phosphate ester, a phosphonate, or a combination thereof.

5. The method of claim 1, wherein the calcium-containing compound comprises calcium hydroxide, calcium oxide, calcium carbonate, or a combination thereof.

6. The method of claim 1, wherein the magnesium-containing compound comprises magnesium hydroxide, magnesium oxide, magnesium carbonate, or a combination thereof.

7. The method of claim 1, wherein the composition comprises from about 20 to about 55 wt. % of the phosphorus-containing compound, about 3 to about 15 wt. % of the calcium-containing compound, about 2 to about 10 wt. % of the magnesium-containing compound, and about 11 to 20 wt. % of the sodium- or potassium-containing base, based on the weight of the combination.

8. The method of claim 1, wherein the composition comprises from about 12.5 to about 25 wt. % of the sodium- or potassium-containing base based on the weight of the combination.

9. The method of claim 8, wherein the composition comprises from about 15 to about 25 wt. % of the sodium- or potassium-containing base based on the weight of the combination.

10. The method of claim 1, wherein the combination further comprises from about 2 to about 10 wt. % of an aluminum-containing compound comprised of alumina, aluminum hydroxide, aluminum oxide hydroxide, a naturally occurring or synthetic alumina-containing mineral or a polymorph thereof, an aluminate salt or a polymorph thereof, an organic aluminum or a combination thereof.

11. The method of claim 1, wherein the substantially amorphous glass dissolves at a rate of loss of less than 60% of the starting total mass over a 28 day period, when heated to 300° F. in deionized water at a concentration of 5 g slowed release polyphosphate glass per 300 mL deionized water.

12. The method of claim 1, wherein the composition comprises the reaction product of the combination consisting essentially of the phosphorus-containing compound, the calcium-containing compound, the magnesium-containing compound, water, and the sodium- or potassium-containing base.

13. The method of claim 12, wherein the substantially amorphous glass dissolves at a rate of loss of less than 60% of the starting total mass over a 28 day period, when heated to 300° F. in deionized water at a concentration of 5 g slowed release polyphosphate glass per 300 mL deionized water.

14. The method of claim 12, wherein the composition comprises from about 20 to about 55 wt. % of the phosphorus-containing compound, about 3 to about 15 wt. % of the calcium-containing compound, about 2 to about 10 wt. % of the magnesium-containing compound, and about 11 to 20 wt. % of the sodium- or potassium-containing base, based on the weight of the combination.

15. The method of claim 12, wherein the composition comprises from about 20 to about 55 wt. % of the phosphorus-containing compound, about 3 to about 12 wt. % of the calcium-containing compound, about 4 to about 9 wt. % of the magnesium-containing compound, and about 11 to 20 wt. % of the sodium- or potassium-containing base, based on the weight of the combination.

16. The method of claim 1, wherein the substantially amorphous glass has a coating on at least a portion of a surface of the particulate, the coating comprising a water-insoluble polymer, a water-insoluble particulate, or a combination thereof, wherein the coating weight is about 0.01 wt. % to 90 wt. % of the mass of the coated particulate.

17. The method of claim 1, wherein the composition comprises from about 20 to about 55 wt. % of the phosphorus-containing compound, about 3 to about 12 wt. % of the calcium-containing compound, about 4 to about 9 wt. % of the magnesium-containing compound, and about 11 to 20 wt. % of the sodium- or potassium-containing base, based on the weight of the combination.

18. The method of claim 1, wherein the composition comprises from about 20 to about 45 wt. % of the phosphorus-containing compound, about 3 to about 12 wt. % of the calcium-containing compound, about 4 to about 9 wt. % of the magnesium-containing compound, and about 12.5 to 20 wt. % of the sodium- or potassium-containing base, based on the weight of the combination.

* * * * *